(12) United States Patent
Choi et al.

(10) Patent No.: US 12,501,039 B2
(45) Date of Patent: Dec. 16, 2025

(54) METHOD AND APPARATUS FOR VIDEO CODING USING DE-BLOCKING FILTERING BASED ON SEGMENTATION INFORMATION

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Han Sol Choi, Dongducheon-si (KR); Min Hun Lee, Uijeongbu-si (KR); Dong Gyu Sim, Seoul (KR); Seung Wook Park, Yongin-si (KR)

(73) Assignees: HYUNDAI MOTOR COMPANY, Seoul (KR); KIA CORPORATION, Seoul (KR); KWANGWOON UNIVEERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 133 days.

(21) Appl. No.: 18/243,256

(22) Filed: Sep. 7, 2023

(65) Prior Publication Data

US 2023/0421758 A1 Dec. 28, 2023

Related U.S. Application Data

(63) Continuation of application No. PCT/KR2022/003108, filed on Mar. 4, 2022.

(30) Foreign Application Priority Data

Mar. 9, 2021 (KR) .................. 10-2021-0030850
Mar. 4, 2022 (KR) .................. 10-2022-0027870

(51) Int. Cl.
*H04N 19/117* (2014.01)
*H04N 19/119* (2014.01)
(Continued)

(52) U.S. Cl.
CPC ......... *H04N 19/117* (2014.11); *H04N 19/119* (2014.11); *H04N 19/176* (2014.11); *H04N 19/46* (2014.11); *H04N 19/82* (2014.11)

(58) Field of Classification Search
CPC .... H04N 19/117; H04N 19/119; H04N 19/14; H04N 19/176; H04N 19/46; H04N 19/82; H04N 19/86
(Continued)

(56) References Cited

U.S. PATENT DOCUMENTS 8,325,796 B2 12/2012 Wilkins et al.
9,924,161 B2 3/2018 Wilkins et al.
(Continued)

FOREIGN PATENT DOCUMENTS

KR 20110056388 A 5/2011
KR 20140124040 A * 10/2014 ............. H04N 19/00
(Continued)

OTHER PUBLICATIONS

International Search Report and Written Opinion cited in corresponding international app No. PCT/KR2022/003108; Jun. 14, 2022; 9pp.

*Primary Examiner* — Behrooz M Senfi
(74) *Attorney, Agent, or Firm* — Lempia Summerfield Katz LLC

(57) ABSTRACT

A video coding method and an apparatus using a deblocking filtering based on segmentation information are disclosed. The video coding method and the apparatus perform
(Continued)

deblocking filtering using segmentation information of an image to avoid performing filtering at the boundary of an object within the image.

14 Claims, 14 Drawing Sheets

(51) Int. Cl.
*H04N 19/176* (2014.01)
*H04N 19/46* (2014.01)
*H04N 19/82* (2014.01)

(58) Field of Classification Search
USPC .................................................. 375/240.02

See application file for complete search history.

(56) References Cited

U.S. PATENT DOCUMENTS

| | | |
|---|---|---|
| 10,225,549 B1 | 3/2019 | Wilkins et al. |
| 11,122,299 B2 | 9/2021 | Wang et al. |
| 11,259,019 B2 | 2/2022 | Zhu et al. |
| 2010/0061444 A1 | 3/2010 | Wilkins et al. |
| 2013/0101019 A1 | 4/2013 | Wilkins et al. |
| 2019/0058879 A1 | 2/2019 | Wilkins et al. |
| 2020/0404333 A1* | 12/2020 | Wang .................. H04N 19/176 |
| 2020/0413055 A1 | 12/2020 | Kusakabe et al. |
| 2021/0120239 A1* | 4/2021 | Zhu ...................... H04N 19/86 |
| 2021/0377570 A1 | 12/2021 | Wang et al. |
| 2021/0409701 A1 | 12/2021 | Zhu et al. |
| 2023/0388646 A1* | 11/2023 | Kim .................... H04N 19/103 |

FOREIGN PATENT DOCUMENTS

| | | |
|---|---|---|
| KR | 20200128588 A | 11/2020 |
| KR | 20210011458 A | 2/2021 |

* cited by examiner

FIG. 8

METHOD AND APPARATUS FOR VIDEO CODING USING DE-BLOCKING FILTERING BASED ON SEGMENTATION INFORMATION

CROSS-REFERENCE TO RELATED APPLICATIONS

This application is a Continuation of International Application No. PCT/KR2022/003108 filed on Mar. 4, 2022, which claims priority to Korean Patent Application No. 10-2021-0030850 filed on Mar. 9, 2021, and Korean Patent Application No. 10-2022-0027870 filed on Mar. 4, 2022, the entire disclosures of each of which are incorporated herein by reference.

TECHNICAL FIELD

The present disclosure relates to a video coding method and an apparatus using a deblocking filtering based on segmentation information.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

Meanwhile, in the VVC technique, the video encoding/decoding apparatus performs in-loop filtering in order of Luma Mapping with Chroma Scaling (LMCS), deblocking filtering, Sample Adaptive Offset (SAO) filter, and Adaptive Loop Filter (ALF). Deblocking filtering performs long filtering or short filtering, and short-length filtering includes strong filtering and weak filtering as in the HEVC standard. The video encoding/decoding apparatus performs deblocking filtering in order of determining a boundary and a filter length, determining whether to apply filtering, determining the filtering type, and performing filtering.

Deblocking filtering is performed on four columns around a horizontal deblocking boundary or four rows around a vertical deblocking boundary. The video encoding/decoding apparatus determines the presence or absence of deblocking filtering, filter length, and filter strength per four columns or rows basis. The determination process may utilize pixels from the first and lastcolumns of the four columns or the first and last rows of the four rows.

Meanwhile, since the image size, resolution, and frame rate gradually increase, the amount of data to be encoded also increases. Accordingly, in terms of deblocking filtering, a new compression technique providing higher coding efficiency and an improved image enhancement effect than existing compression techniques is also required.

SUMMARY

The present disclosure in some embodiments seeks to a video coding method and an apparatus for performing deblocking filtering using segmentation information of an image to avoid performing filtering at the boundary of an object within the image.

At least one aspect of the present disclosure provides a method performed by a computing device for applying deblocking filtering on a restored area of an image. The method comprises performing segmentation on the restored area to partition the restored area into separate objects and generating segmentation information of the objects. The restored area is a picture, a slice, or a plurality of coding units. The method also comprises selecting boundaries between coding units and transform units within the restored area as filtering boundaries to which the deblocking filtering is applied. The method also comprises, for each filtering boundary, initializing P filter length and Q filter length of each block adjacent to the filtering boundary. The method also comprises setting P sub-area and Q sub-area belonging to the same object using the segmentation information for P area and Q area with a predetermined size adjacent to the filtering boundary and adjusting the P filter length and the Q filter length. The method also comprises calculating a degree of spatial change in the P sub-area and the Q sub-area based on the adjusted P filter length and Q filter length. The method also comprises determining whether to apply the deblocking filtering based on the degree of spatial change for the P sub-area and the Q sub-area and determining a type of deblocking filter when the deblocking filtering is applied. The method also comprises performing the deblocking filtering by applying the deblocking filter to the P sub-area and Q the sub-area.

Another aspect of the present disclosure provides a deblocking filtering apparatus. The apparatus comprises a segmentation performing unit configured to perform segmentation on a restored area to partition the restored area into separate objects and generate segmentation information of the objects. The restored area is a picture, a slice, or a plurality of coding units. The apparatus also comprises a boundary and filter length determining unit configured to select boundaries between coding units and transform units within the restored area as filtering boundaries to which deblocking filtering is applied and, for each filtering boundary, initialize P filter length and Q filter length of each block adjacent to the filtering boundary. The apparatus also comprises a filter length adjusting unit configured to set P sub-area and Q sub-area belonging to the same object using the segmentation information for P area and Q area with a predetermined size adjacent to the filtering boundary and adjust the P filter length and the Q filter length. The apparatus also comprises a deblocking determining unit configured to calculate a degree of spatial change in the P sub-area and the Q sub-area based on the adjusted P filter length and Q filter length, determine whether to apply the deblocking filtering based on the degree of spatial change for the P sub-area and Q sub-area, and determine a type of deblocking filter when the deblocking filtering is applied. The apparatus also comprises a deblocking performing unit configured to perform the deblocking filtering by applying the deblocking filter to the P sub-area and Q sub-area.

As described above, the present disclosure provides a video coding method and an apparatus for performing deblocking filtering using segmentation information of an image to avoid performing filtering at the boundary of an object within the image. Thus, the image quality may be improved.

BRIEF DESCRIPTION OF THE DRAWINGS

FIG. 8 illustrates a boundary segment and P area and Q area on the both sides of the boundary segment.

DETAILED DESCRIPTION

Figure 1:
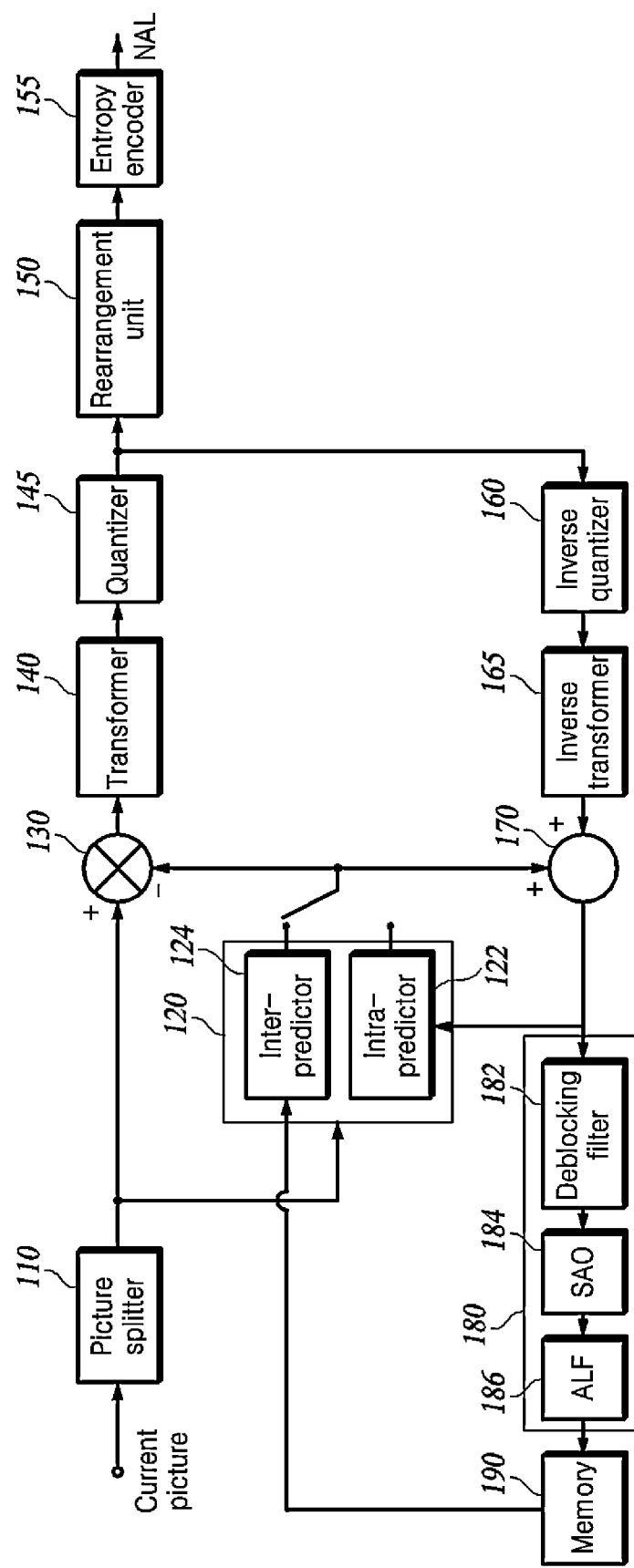
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
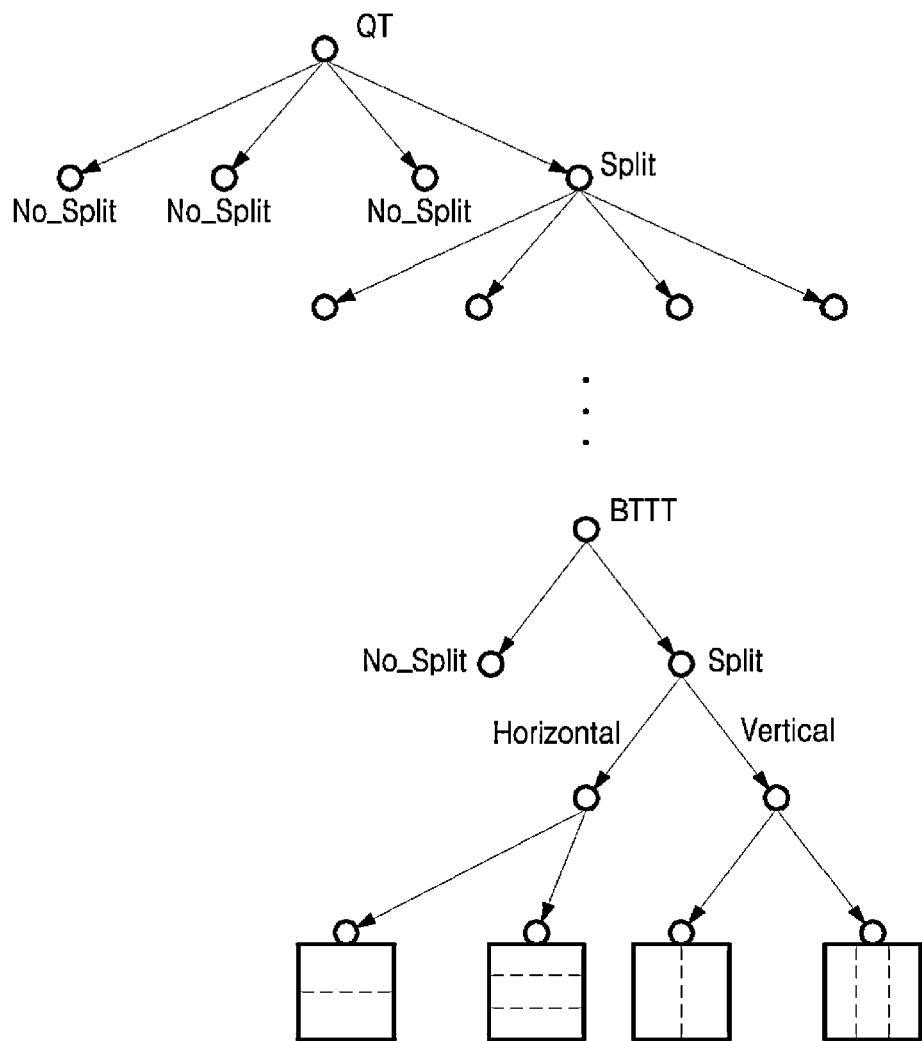
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
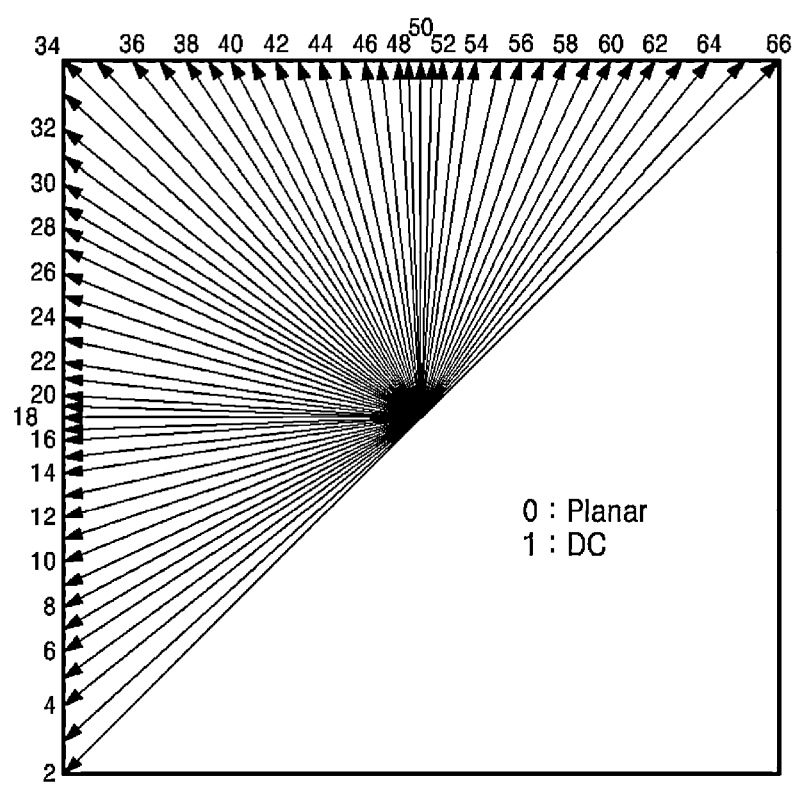
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
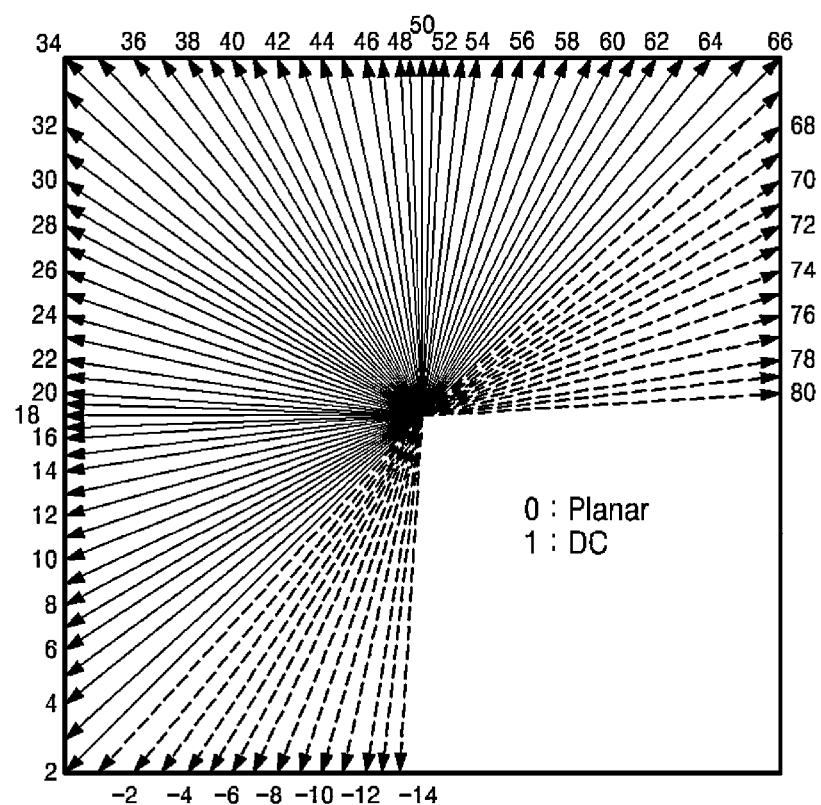

For efficient directional prediction for the current block having a rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component.

Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
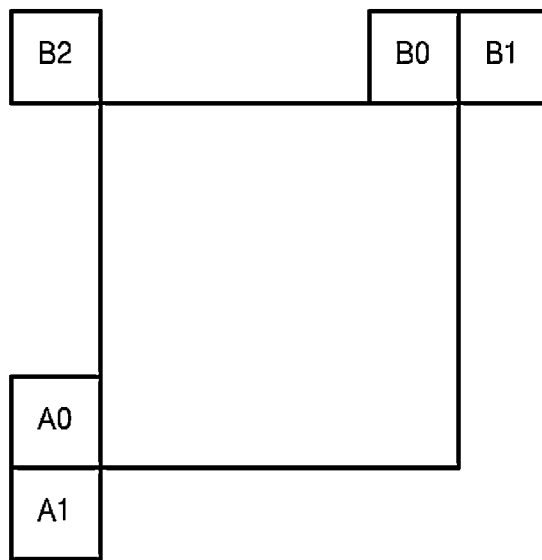
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_jdx) on the transform function pair in the MTS is encoded by the entropy encoder 155 and signaled to the video decoding apparatus.

The quantizer 145 quantizes the transform coefficients output from the transformer 140 using a quantization parameter (QP) and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
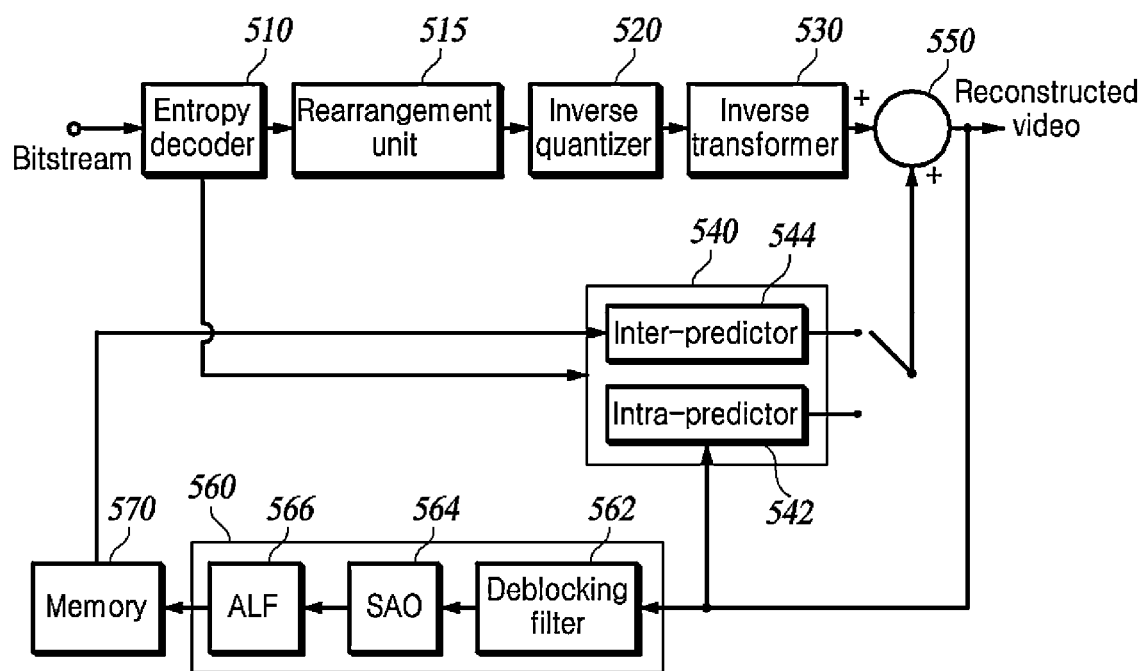
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information, and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus for performing deblocking filtering using segmentation information of an image to avoid performing filtering at the boundary of an object within the image.

The embodiments below may be applied to a deblocking filter 182 within a loop filter unit 180 of a video encoding apparatus. Also, the embodiments may be applied to a deblocking filter 562 within a loop filter unit 560 of a video decoding apparatus.

In the following descriptions, the term 'target block' to be encoded/decoded may be used interchangeably with the current block or coding unit (CU) as described above, or the term 'target block' may refer to some area of the coding unit.

In the following descriptions, operations of the deblocking filter are described with respect to a luma block that includes luma samples. Meanwhile, deblocking filtering may be performed on a chroma block by employing similar operations.

Also, deblocking filtering is used compatibly with deblocking, and a deblocking filer is used compatibly with a deblocking filtering apparatus.

I. Deblocking Filter

As described above, a deblocking filter filters a boundary between restored blocks to remove blocking artifacts caused from encoding/decoding per block basis. The primary cause of the blocking artifacts is the difference between average sample values of neighboring blocks. The deblocking filter aims to achieve smooth transition across block boundaries while preserving natural edges. In general, whether a boundary is considered as a natural edge depends on the quantization parameter (QP). For example, a low value of QP may indicate the presence of natural edges with a small magnitude.

Figure 6:
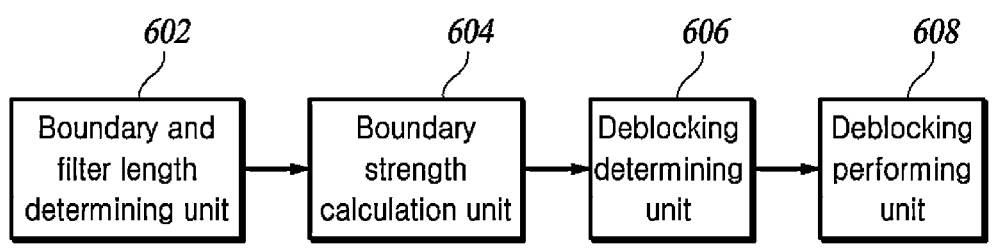
FIG. 6 is a block diagram illustrating a deblocking filtering apparatus.

FIG. 6 is a block diagram illustrating a deblocking filtering apparatus.

As shown in FIG. 6, in the Versatile Video Coding (VVC) technique, a deblocking filtering apparatus includes all or part of a boundary and filter length determining unit 602, a boundary strength calculation unit 604, a deblocking determining unit 606, and a deblocking performing unit 608.

The boundary and filter length determining unit 602 determines filtering boundaries to which deblocking may be applied in a restored area and determines an initial value of the deblocking filter length for each filtering boundary. Here, the restored area may be a picture, a slice, or a plurality of CUs.

Deblocking may be applied to boundaries between CUs and TUs based on 4×4 grids. In the case of a luma block, deblocking may be applied to boundaries between prediction units (PUs) in a CU based on 8×8 grids. Here, PUs represent subblocks within a CU, which use an affine mode or a subblock-based temporal motion vector prediction (SbTMVP) mode.

Meanwhile, when a block boundary among the filtering boundaries coincides with a picture boundary, deblocking may not be applied. Also, deblocking may not be applied when a block boundary coincides with the boundary of a subpicture, a tile, or a slice, but in-loop filtering is not performed at the corresponding boundary of the subpicture, the tile, or the slice.

Figure 7:
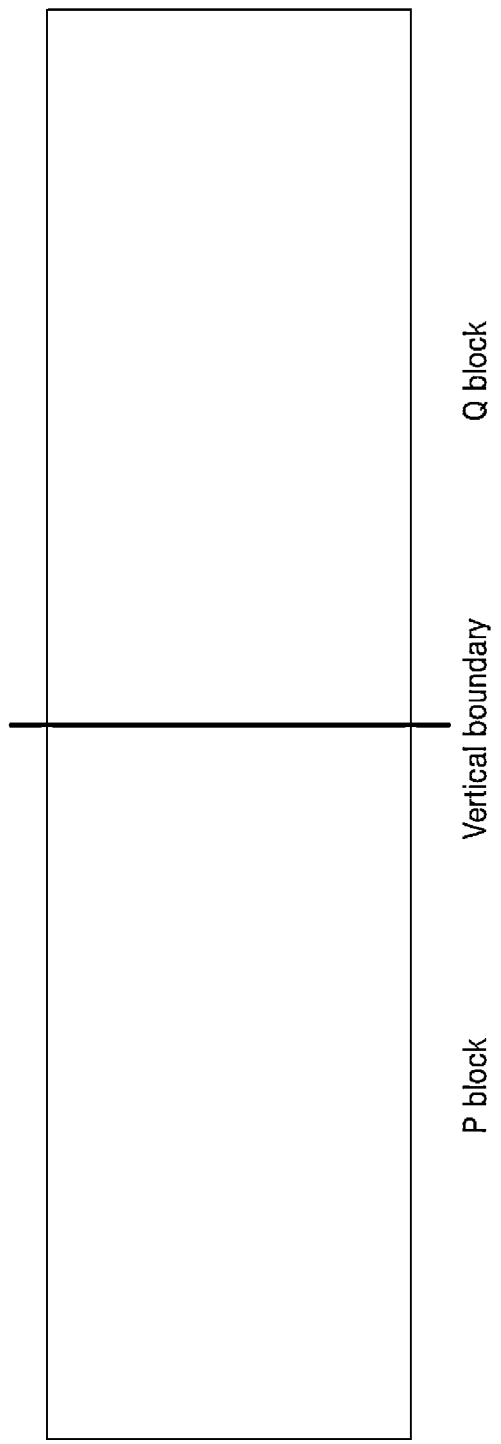
FIG. 7 illustrates P block and Q block neighboring a vertical boundary, which is a filtering boundary.

FIG. 7 illustrates P block and Q block neighboring a vertical boundary, which is a filtering boundary.

As shown in FIG. 7, the filter length represents the number of samples to which deblocking filtering is applied for blocks P and Q adjacent to the filtering boundary. In the following descriptions, filter length and deblocking length are used interchangeably. Also, the filter lengths of P block and Q block are expressed as $S_P$ and $S_Q$, respectively. Each of the $S_P$ and $S_Q$ values depends on the size of the block's side perpendicular to the boundary between P block and Q block.

At the CU/TU boundary, $S_P$ and $S_Q$ are initialized to 7 when the size of the CU/TU block's side is 32 or more, $S_P$ and $S_Q$ are initialized to 1 when the size is 4 or less, and $S_P$ and $S_Q$ are initialized to 3 in other cases. Also, when a PU within a CU is used, at the CU/TU boundary, $S_P$ is initialized to min(5, $S_P$), and $S_Q$ is initialized to min(5, $S_Q$). Also, $S_P$ and $S_Q$ are initialized to 1 when the difference between the CU/TU boundary and the PU boundary is 4, $S_P$ and $S_Q$ are initialized to 2 when the difference is 8, and $S_P$ and $S_Q$ are initialized to 3 in other cases. The filter length may be further reduced in the subsequent step of determining deblocking for each P/Q area.

Meanwhile, the example of FIG. 7 shows a vertical boundary between P block and Q block, and the horizontal boundary between P block and Q block may be expressed by using a rotation of 90 degrees and index change. Accordingly, the filtering boundary may be horizontal or vertical. Deblocking filtering may be first performed on all vertical boundaries within a picture, a slice, or a plurality of CTUs, and then filtering may be performed on horizontal boundaries.

In the following descriptions, although filtering at the vertical boundary is described using the example of FIG. 8, the same filtering may be applied to the horizontal boundary by rotating the application direction of pixels.

Figure 8:
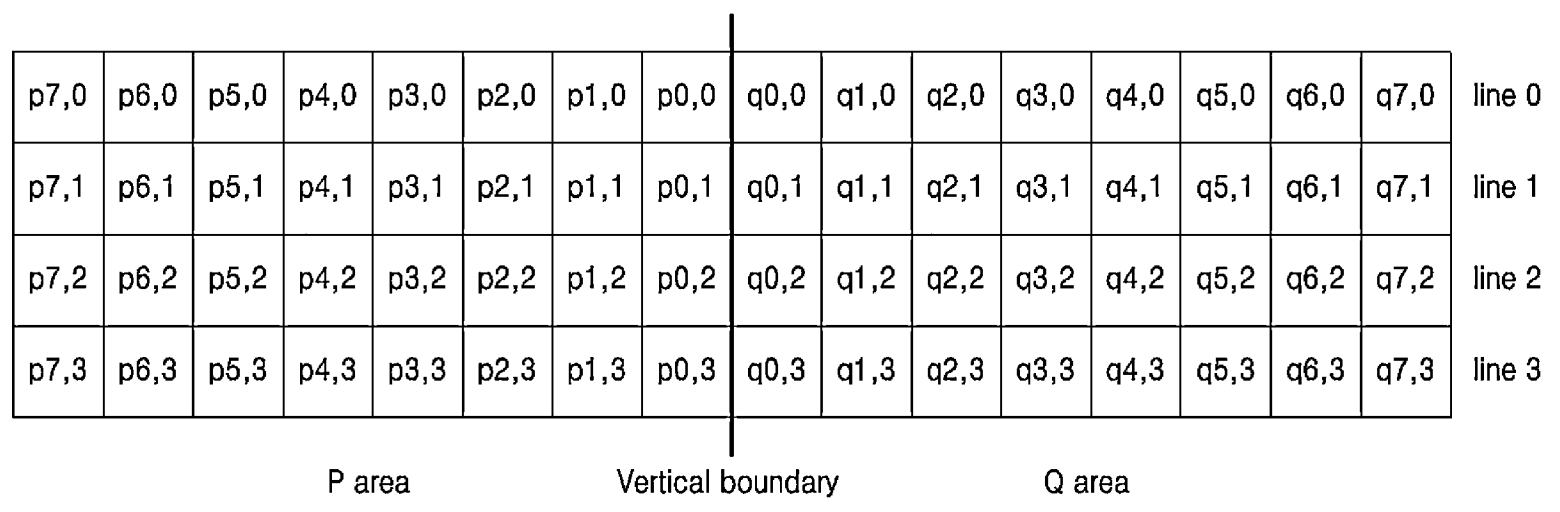

FIG. 8 illustrates a boundary segment and P area and Q area on the both sides of the boundary segment.

The boundary strength calculation unit 604 calculates boundary strength (bS) of determined filtering boundaries. bS may have a value of 0, 1, or 2, and when bS=0, deblocking filtering is not applied.

As shown in FIG. 8, bS is determined for the boundary segment of a length of four samples. In the descriptions below, P area and Q area denote both areas of the boundary segment. P area may be the whole or part of the P block, and Q area may be the whole or part of the Q block. The boundary segment may be the whole or part of the boundary between P block and Q block.

Meanwhile, in the example of FIG. 8, degree of spatial change of the first line (line and the last line (line 3) of P area and Q area may be used for determination of deblocking in the subsequent steps.

bS may be determined according to the coding characteristics of P area and Q area. For example, when P area and Q area are all intra coded, bS is set to 2. When both P area and Q area are inter coded, and the difference between motion vectors is larger than or equal to a predetermined value, or P area or Q area has a transform coefficient different from 0, bS is set to 1. When P area and Q area use the Block-level Differential Pulse Code Modulation (BPPCM), bS is set to 0. When P area and Q area use the Combined Intra/Inter Prediction (CIIP) mode, bS is set to 2. When P area and Q area use the Intra-Picture Block Copy (IBC) mode, bS is set to 1. Meanwhile, for other unspecified cases, bS may be set to 0.

In the case of a boundary segment with a bS value other than 0, the deblocking determining unit 606 determines whether to apply filtering and the type of deblocking filter based on the degree of spatial change in P area and Q area on both sides of the boundary segment.

The deblocking determining unit 606 first derives $t_c$ and $\beta$, which are parameters dependent on QP. In general, by increasing $\beta$ and $t_c$ as QP increases, the application of deblocking filtering may be suppressed in the presence of natural edges. The amount of smoothing for deblocking filtering may be adjusted by $t_c$, which limits clipping so that a filtered value does not deviate from the value before filtering.

The deblocking determining unit 606 checks the degree of spatial change at the boundary to determine applicability of a long filter when $S_P$ or $S_Q$ is larger than 3. In another case, i.e., when $S_P$ and $S_Q$ is smaller than or equal to 3, the deblocking determining unit 606 checks the degree of spatial change at the boundary to determine applicability of a short filter. According to the conditions expressed by Eqs. 1 to 4, a short filter may be selected.

$$dPQ_0 + dPQ_3 < \beta \quad [\text{Eq. 1}]$$

$$2dPQ_i < thr1 \quad [\text{Eq. 2}]$$

$$sP_i + sQ_i < thr2 \quad [\text{Eq. 3}]$$

$$|p_{0,i} - q_{0,i}| < 2.5 t_c \quad [\text{Eq. 4}]$$

In the equations above, i is 0 or 3, and as described above, the degree of spatial change may be checked by using line 0 and line 3 of P area and Q area. $dPQ_i$ is an element for checking natural edges, which is defined as a sum of $dP_i$ and $dQ_i$. $dP_i$ and $dQ_i$ are defined as $|p_{0,i} - 2p_{1,i} + p_{2,i}|$ and $|q_{0,i} - 2q_{1,i} + q_{2,i}|$, respectively. $sP_i$ and $sQ_i$ are elements for checking flatness of signals, which are defined as $|p_{0,i} - p_{3,i}|$ and $|q_{0,i} - q_{3,i}|$, respectively. Thresholds thr1 and thr2 are defines as $\beta/4$ and $\beta/8$. The left side of Eq. 4 represents an element for checking flatness between P area and Q area.

When only the condition expressed by Eq. 1 is satisfied, $S_P$ and $S_Q$ are determined to be 1 or 2, and a short and weak filter is selected. Also, when all the conditions expressed by Eqs. 1 to 4 are satisfied, $S_P$ and $S_Q$ may be determined to be 3, and a short and strong filter may be selected. When even the condition of Eq. 1 is not satisfied, deblocking filtering is not applied to the corresponding boundary.

For a long filter, the elements used in Eqs. 1 to 4 are modified to include more samples. When $S_P$ is larger than 3, $dP_i$ and $sP_i$ become further dependent on $|p_{3,i} - 2p_{4,i} + p_{5,i}|$ and $|p_{3,i} - p_{S_P,i}|$, respectively. Also, when $S_P$ is 7, $|p_{4,i} - p_{5,i} - p_{6,i} + p_{7,i}|$ is additionally used when $sP_i$ is calculated. When $S_Q$ is larger than 3, $dQ_i$ and $sQ_i$ may be modified similarly.

To avoid over-smoothing by the long filter, thr1 and thr2 are changed to $\beta/16$ and respectively. When all of the conditions expressed by Eqs. 1 to 4 reflecting the changed conditions are satisfied, a long filter is selected. On the other hand, if any of the conditions by Eqs. 1 to 4 reflecting the changed conditions is not satisfied, the deblocking determining unit 606 reverts to selecting the short filter as described above.

When deblocking filtering is applied, the deblocking performing unit 608 performs deblocking filtering using the filter selected for P area and Q area. At this time, deblocking filtering may be performed on the four lines ($0 \le i \le 3$) for which degree of spatial change has been confirmed.

When $S_P$ or $S_Q$ are larger than 3, and a long filter is selected, the deblocking performing unit 608 performs deblocking filtering using a preset linear filter on the samples $p_{j,i}$ ($0 \le j < S_P$) within P area and the samples $q_{j,i}$ ($0 \le j \le S_Q$) within Q area. The coefficients of the preset linear filter may be shared between the video encoding apparatus and the video decoding apparatus.

When $S_P$ and $S_Q$ are 3, and a short and strong filter is selected, the deblocking performing unit 608 performs deblocking filtering using a preset linear filter on the samples $p_{j,i}$ ($0 \le j < S_P$) within P area and the samples $q_{j,i}$ ($0 \le j < S_Q$) within Q area. The coefficients of the preset linear filter may be shared between the video encoding apparatus and the video decoding apparatus.

When a short and weak filter is selected, the deblocking performing unit 608 performs deblocking filtering according to a predetermined method on the samples $p_{j,i}$ ($0 \le j < S_P$) within P area and the samples $q_{i,j}$ ($0 \le j < S_Q$) within Q area. At this time, $S_P$ and $S_Q$ may be 1 or 2. The predetermined method may be shared between the video encoding apparatus and the video decoding apparatus.

II. Deblocking Filter Using Segmentation Information

In the following descriptions, a deblocking filter for more closely reflecting object boundaries among natural edges within an image and a method according to the deblocking filter is described.

Figure 9:
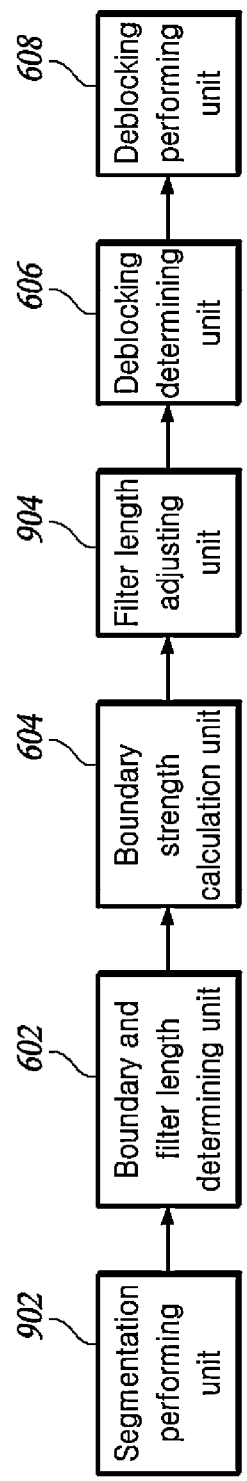
FIG. 9 is a block diagram illustrating a deblocking filtering apparatus using segmentation information according to one embodiment of the present disclosure.

FIG. 9 is a block diagram illustrating a deblocking filtering apparatus using segmentation information according to one embodiment of the present disclosure.

The deblocking filtering apparatus according to the present embodiment uses segmentation information of an image to avoid performing filtering at the object boundaries in an image. The deblocking filtering apparatus includes all or part of a segmentation performing unit 902, a boundary and filter length determining unit 602, a boundary strength calculation unit 604, a filter length adjusting unit 904, a deblocking determining unit 606, and a deblocking performing unit 608.

After a picture, a slice, or a plurality of CUs are restored, the segmentation performing unit 902 performs segmentation on the restored area to partition the area into separate objects and generate segmentation information on the objects. The segmentation performing unit 902 may output, as segmentation information, a map in which each object is assigned a corresponding index per pixel basis. The segmentation may be equally performed in the video encoding apparatus and the video decoding apparatus.

The segmentation performing unit 902 may perform segmentation based on a boundary detection method within an image, a region separation method, a clustering method, and the like. Alternatively, segmentation may be performed based on a network composed of a single or a plurality of convolutional layers. The segmentation performing unit 902 may obtain the number of objects per picture or slice basis and then may partition the image into as many sub-images as the number of objects. For example, the segmentation performing unit 902 within the video encoding apparatus may obtain the number of objects from a high-level, and the segmentation performing unit 902 within the video decoding apparatus may decode the number of objects from a bitstream.

Meanwhile, the video encoding apparatus may transmit a flag indicating whether to perform segmentation, i.e., a segmentation application flag to the video decoding apparatus per slice or CU basis. After parsing the segmentation application flag, the video decoding apparatus may or may not perform segmentation depending on the true/false value of the flag. Alternatively, the video decoding apparatus may derive whether to perform segmentation according to a prior agreement.

The video decoding apparatus may determine the segmentation application flag as follows. In the descriptions below, the original slice, the original CU, or the original CU group is represented as the original area, and a restored slice, a restored CU, or a restored CU group is represented as a restored area. When the same segmentation method is performed respectively on the original area and the restored area, and a pixel difference as large as a predetermined threshold value occurs between the segmentation results from the original area and the restored area, the video encoding apparatus may express not performing segmentation by setting the segmentation application flag of the corresponding slice or CU as false.

The video decoding apparatus may derive whether to perform segmentation per slice, CU, or CTU basis as follows. For any slice, when the basic QP of the slice is greater than a predetermined reference value, or the average QP of CUs within the slice is greater than the predetermined reference value, segmentation may not be performed on the corresponding slice. On the other hand, when the basic QP or the average QP is equal to or smaller than the predetermined reference value, segmentation may be performed. Alternatively, for each CTU, when the average QP of a plurality of CUs in the CTU is greater than the predetermined reference value, segmentation may not be performed on the CTU, and when the average QP is equal to or smaller than the predetermined reference value, segmentation may be performed. Alternatively, for each CU, segmentation may not be performed on a coding unit when the QP of the CU is greater than the predetermined reference value, and segmentation may be performed when the QP of the CU is equal to or smaller than the predetermined reference value.

Meanwhile, when segmentation is not performed on a slice or a CU, subsequent steps using the segmentation result may not be performed on the corresponding slice or CU.

As described above, the boundary and filter length determining unit 602 determines filtering boundaries in a restored area to which deblocking may be applied and initializes the deblocking filter lengths $S_P$ and $S_Q$ for the respective filtering boundaries. For the neighboring blocks P and Q of the filtering boundary shown in FIG. 7, the filter length represents the number of samples to which deblocking filtering is applied.

Figure 10:
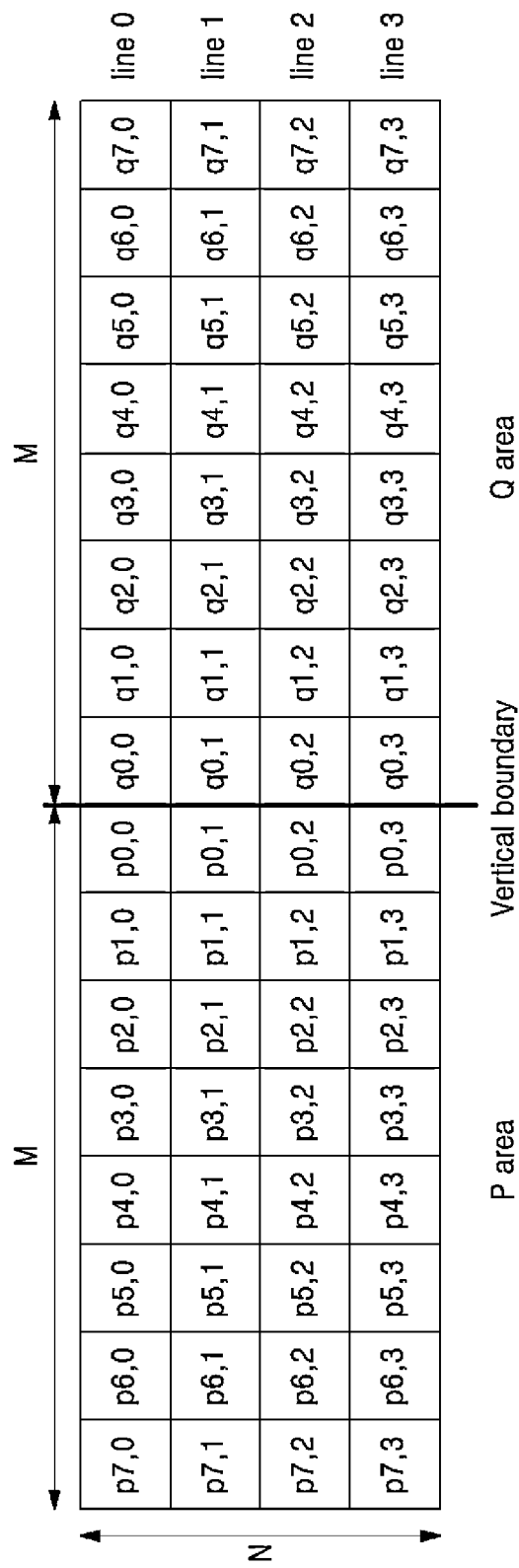
FIG. 10 illustrates P area and Q area with a size of M×N.

The filter length adjusting unit 904 determines whether to perform deblocking filtering by using the segmentation result and adjusts the deblocking filter lengths $S_P$ and $S_Q$. At this time, the filter length adjusting unit 904 may apply the segmentation result to P area and Q area with a size of M×N, which neighbor the boundary segment with a sample length of N (where N is a natural number) and contain M samples perpendicular to the boundary (where M is a natural number), as shown in FIG. 10. For example, in the example of FIG. 10, for P area and Q area neighboring the vertical boundary, M=8, and N=4.

As described above, the filtering boundary may have the horizontal or vertical direction. In the present embodiment, deblocking filtering may be performed first on all boundaries in the vertical direction within a picture, a slice, or a plurality of CTUs. Alternatively, deblocking filtering may be performed first on all boundaries in the horizontal direction. In another embodiment, deblocking filtering may be performed in a specific order on the horizontal and vertical boundaries.

In the descriptions below, although descriptions are given based on filtering at the boundary of vertical direction using the example of FIG. 10, the same filtering may be applied to the boundaries in the horizontal direction by rotating the application direction of pixels.

In the following descriptions, a process for determining whether to apply deblocking filtering from a segmentation result by the filter length adjusting unit 904 is described. The filter length adjusting unit 904 assesses condition A, condition B, and condition C for each line of N samples (0≤n<N) and performs determination of whether to perform deblocking at the current deblocking boundary, setting of a boundary subgroup, and adjustment of the filter length by collecting the assessment result of each line. In the conditions below, the following relationship holds: $k_0 < k_1 < K_2 < M$.

(Condition A) $p_{0,n}$ and $q_{0,n}$ are included in the same object.

(Condition B) Every $p_{m,n}$ belonging to the range (0<m≤$k_0$) is included in the same object together with $p_{0,n}$, and every $q_{m,n}$ belonging to the range (0<m≤$k_0$) are included in the same object together with $q_{0,n}$.

(Condition C) Every $p_{m,n}$ belonging to the range (0<m≤$k_0$), (0<m≤$k_1$), or (0<m≤$k_2$) is included in the same object together with $p_{0,n}$, and every $q_{m,n}$ belonging to the range (0<m≤$k_0$), (0<m≤$k_1$), or (0<m≤$k_2$) are included in the same object together with $q_{0,n}$. However, the same case as Condition B is excluded.

If the number of successive lines satisfying conditions A and B, sub_row_num, is smaller than min_row_num, the minimum number of lines, and $p_{0,n}$ of the corresponding lines are not all included in the same object, deblocking filtering is not applied to the boundary between the current P area and Q area. In this case, deblocking filtering is not applied by considering that the object boundary is present in the P area in the range of (0≤m≤$k_0$) or Q area in the range of (0≤m≤$k_0$).

Here, the minimum number of lines min_row_num may be transmitted from the video encoding apparatus or predefined by the same value in advance between the video encoding apparatus and the video decoding apparatus.

Meanwhile, when the number of successive lines satisfying conditions A and B or conditions A and C, sub_row_num is larger than or equal to min_row_num, the minimum number of lines, and $p_{0,n}$ of the corresponding lines all belong to the same object, the filter length adjusting unit 904 sets the areas that include the corresponding sub_row_num lines and the boundary as the deblocking sub-area and the deblocking sub-boundary. Also, the filter length adjusting unit 904 sets the area with a size of sub_row_num×($k^P$+1) on the left of the deblocking sub-boundary as P sub-area and the area with a size of sub_row_num×($k^Q$+1) on the right of the deblocking sub-boundary as Q sub-area. Here, $k^P$ and $k^Q$ are defined as the filter lengths of P sub-area and Q sub-area. In the present embodiment, deblocking filtering may be performed on the pixels within the deblocking sub-area belonging to the same object, namely, pixels within P sub-area and Q sub-area.

Also, when a plurality of P sub-area and Q sub-area pairs are present for the deblocking sub-boundary determined as described above, the filter length adjusting unit 904 may select the pair of P sub-area and Q sub-area, which yields the largest value of ($k^P$+$k^Q$+sub_row_num). At this time, the largest P sub-area may be the same as the P area, and the largest Q sub-area may be the same as the Q area. Accordingly, the length of the longest sub-boundary may be the length of the boundary between the P area and the Q area, i.e., N samples.

In the following descriptions, described is a method for determining $k^P$ and $k^Q$ for the deblocking sub-boundary determined as described above and adjusting the deblocking filter lengths $S_P$ and $S_Q$ accordingly.

When conditions A and B are satisfied, but condition C is not satisfied, the value of $k^P$ and $k^Q$. may be $k_0$. Therefore, the deblocking filter length $S_P$ may be set as min ($k_0$, $S_P$), and $S_Q$ may be set as min ($k_0$, $S_Q$). In other words, when the previous value of $S_P$ is smaller than $k_0$, or the value of $S_Q$ is smaller than $k_0$, the value may be maintained as it is.

When conditions A and C are satisfied, the value of $k^P$ may be $k_0$, $k_1$, or $k_2$, and the value of $k^Q$ may be $k_0$, $k_1$, or $k_2$. However, the case in which $k^P$=$k_0$, and $k^Q$=$k_0$ is excluded. Therefore, the deblocking filter length $S_P$ may be set as min ($k^P$, $S_P$), and $S_Q$ may be set as min ($k^Q$, $S_P$). In other words, when the previous value of $S_P$ is smaller than $k^P$, or the value of $S_Q$ is smaller than $k^Q$, the value may be maintained as it is.

The deblocking filter lengths $S_P$ and $S_Q$ may differ from each other.

Figure 11A:
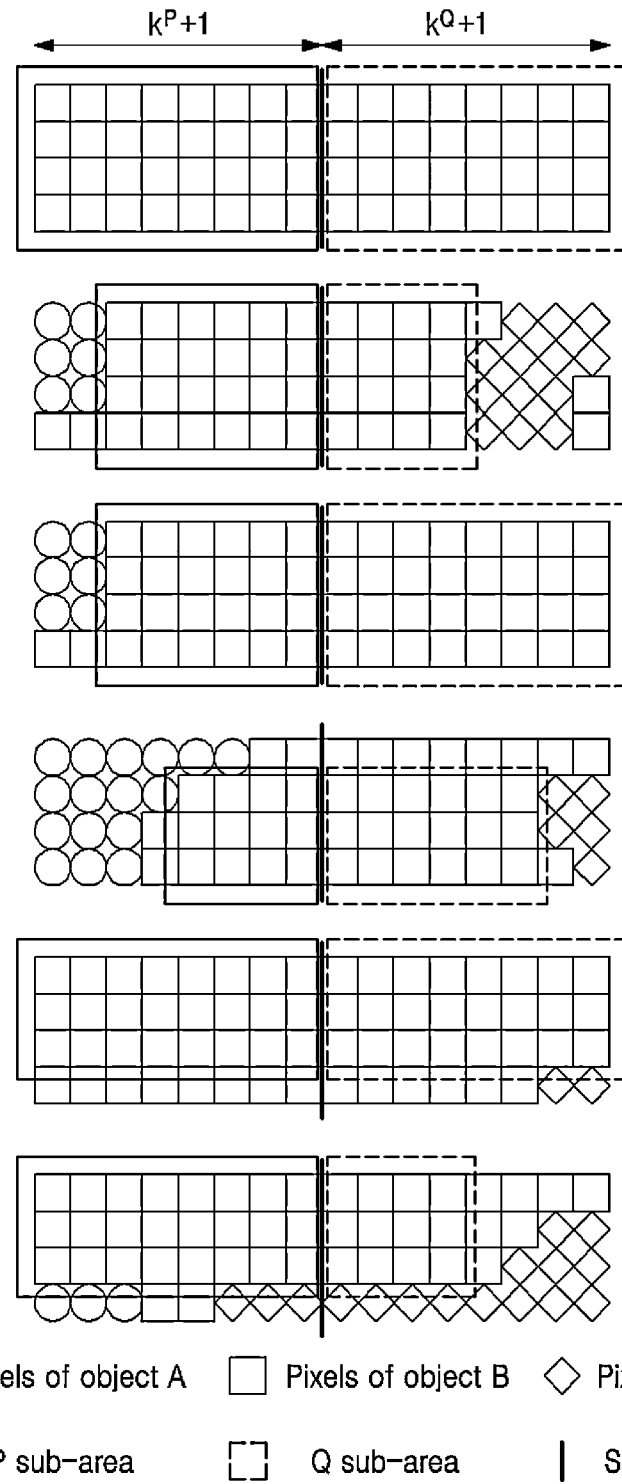
FIGS. 11A, 11B, and 11C illustrate sub-areas using a segmentation result according to one embodiment of the present disclosure.
Figure 11B:
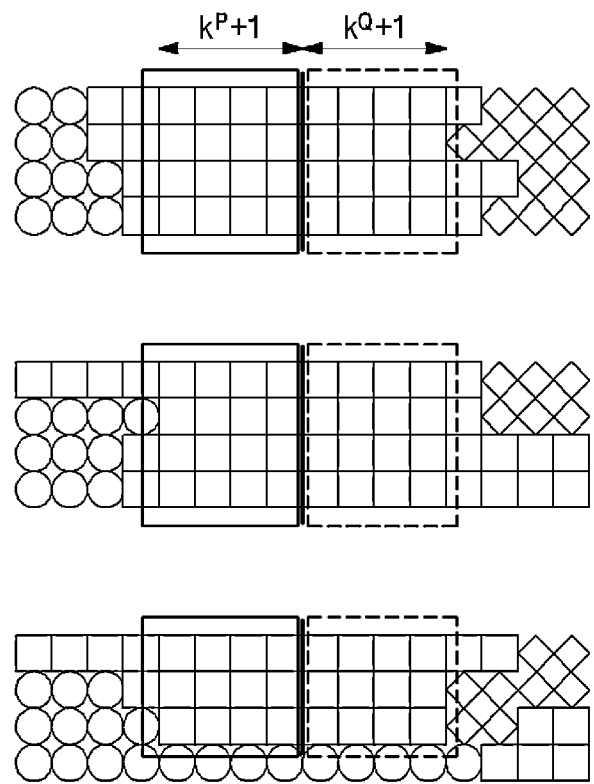
Figure 11C:
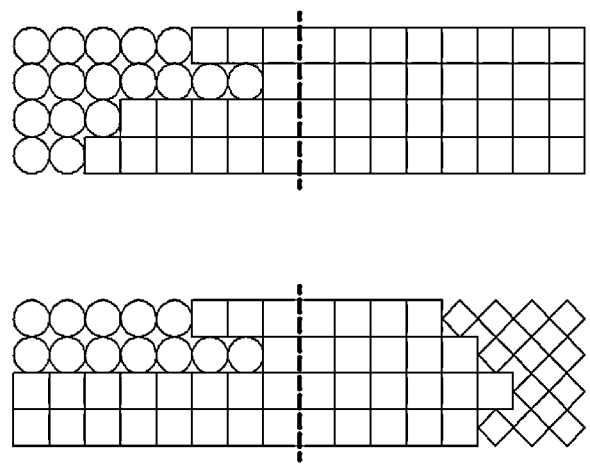

FIGS. 11A, 11B, and 11C illustrate sub-areas using a segmentation result according to one embodiment of the present disclosure.

In the examples of FIGS. 11A, 11B, and 11C, min_row_num=3, $k_0$=3, $k_1$=5, and $k_2$=7. Also, the examples of FIGS. 11A, 11B, and 11C show objects A, B, and C. The example of FIG. 11A illustrates sub-areas in which the deblocking filter length $S_P$ or $S_Q$ is larger than 3, where a long filter may be applied after the P sub-area and Q sub-area. The example of FIG. 11B illustrates sub-areas in which the deblocking filter lengths $S_P$ and $S_Q$ are shorter than or equal to 3, where a short filter may be applied after the P sub-area and Q sub-area. The example of FIG. 11C illustrates a segmentation result in which deblocking filtering is not applied.

The boundary strength calculation unit 604 calculates the boundary strength bS for a boundary to which deblocking has been determined to be applied. As described above, bS may have a value larger than or equal to 0. When bS is less than or equal to a predetermined threshold (e.g., 0), deblocking filtering is not applied.

bS is determined for a sub-boundary with a sample length of sub_row_num between P sub-area and Q sub-area. bS may be determined according to the coding characteristics of P sub-area and Q sub-area. However, since the bS calculation method according to the coding characteristics of P area and Q area may be used in the same way, further detailed descriptions is omitted.

In the case of sub-boundary with a bS larger than a predetermined threshold, the deblocking determining unit 606 determines whether to apply filtering and the type of deblocking filter based on the degree of spatial change in P sub-area and Q sub-area on both sides of the sub-boundary.

The deblocking determining unit 606 first derives $t_c$ and $\beta$, which are parameters dependent on QP.

The deblocking determining unit 606 checks the degree of spatial change at the sub-boundary to determine applicability of a long filter when $S_P$ or $S_Q$ is larger than $k_0$. In another case, namely, when $S_P$ and $S_Q$ is smaller than or equal to $k_0$, the deblocking determining unit 606 checks the degree of spatial change at the sub-boundary to determine applicability of a short filter. According to the conditions expressed by Eqs. 5 to 8, a short filter may be selected.

$$dPQ_{n\_first}+dPQ_{n\_last}<\beta \qquad [\text{Eq. 5}]$$

$$dPQ_n<thr1 \qquad [\text{Eq. 6}]$$

$$sP_n+sQ_n<thr2 \qquad [\text{Eq. 7}]$$

$$|p_{0,n}-q_{0,n}|<w_3 \cdot t_c \qquad [\text{Eq. 8}]$$

In the equations above, n is n_first or n_last, which represents the first line and the last line of P sub-area and Q sub-area. In other words, the degree of spatial change for P sub-area and Q sub-area may be checked by using the first line and the last line.

dPQ n is an element for checking natural edges, which is defined as a sum of $dP_n$ and $dQ_n$. Each of $dP_n$ and $dQ_n$ may be defined as a weighted sum of samples, such as $|p_{0,n}-2p_{1,n}+p_{2,n}|$ and $|q_{0,n}-2 q_{1,n}+q_{2,n}|$. $sP_n$ and $sQ_n$ are elements for checking flatness of signals, which are defined as a weighted sum of samples, such as $|p_{0,n}-p_{k0,n}|$ and $|q_{0,n}-q_{k0,n}|$, respectively. Thresholds thr1 and thr2 may be defined as $w_1 \cdot \beta$ and $w_2 \cdot \beta$, respectively. The left side of Eq. 8 is an element for checking flatness between P sub-area and Q sub-area. Meanwhile, $w_1$, $w_2$, and $w_3$ are predetermined constants, which may be shared between the video encoding apparatus and the video decoding apparatus.

When only the condition expressed by Eq. 5 is satisfied, $S_P$ and $S_Q$ are determined to be 1 or 2, and a short and weak filter is selected. Also, when all the conditions expressed by Eqs. 5 to 8 are satisfied, $S_P$ and $S_Q$ may be determined to be $k_0$, and a short and strong filter may be selected. When even the condition of Eq. 5 is not satisfied, deblocking filtering is not applied to the corresponding boundary.

For a long filter, the elements used in Eqs. 5 to 8 are modified to include more samples. When $S_P$ is larger than $k_0$, $dP_n$, and $sP_n$ become further dependent on a weighted sum of samples, such as $|p_{k0,n}-2p_{k0+1,n}+p_{k0+2,n}|$ and $|p_{k0+1,n}-p_{S_p,n}|$, respectively. Also, when $S_P$ is $k_2$, a weighted sum of samples, such as $|c5_{k0+1} \cdot p_{k0+1,n}+c5_{k0+2} \cdot p_{k0+2,n}+ \ldots +c5_{S_P} \cdot p_{S_P,n}|$, is additionally used when $sP_n$ is calculated. $c5_m$ ($k0+1 \leq m \leq S_P$) are weights for weighted sum. When $S_Q$ is larger than $k_0$, $dQ_n$ and $sQ_n$ may be modified similarly.

To avoid over-smoothing by the long filter, thr1 and thr2 are changed to $w_4 \cdot \beta$ and $w_5 \cdot \beta$, respectively. $w_4$ and $w_5$ are predetermined constants, which may be shared between the video encoding apparatus and the video decoding apparatus. When all of the conditions expressed by Eqs. 5 to 8 reflecting the changed conditions are satisfied, a long filter is selected. On the other hand, if any of the conditions by Eqs. 5 to 8 reflecting the changed conditions is not satisfied, the deblocking determining unit 606 reverts to selecting the short filter as described above.

According to the descriptions above, application of deblocking and filter length are determined using the first line and the last line of P sub-area and Q sub-area. However, the present disclosure is not necessarily limited to the specific description above. In another embodiment, the deblocking determining unit 606 may determine application of deblocking and filter length using all or part of the lines of P sub-area and Q sub-area.

When deblocking filtering is applied, the deblocking performing unit 608 performs deblocking filtering using the filter selected for P sub-area and Q sub-area. At this time, deblocking filtering may be performed on the sub_row_num lines (n_first≤n≤n_last) for which degree of spatial change has been confirmed.

When $S_P$ or $S_Q$ are larger than $k_0$, and a long filter is selected, the deblocking performing unit 608 performs deblocking filtering as shown in Eq. 9 on the samples $p_{m,n}$ (0≤m<$S_P$) within P sub-area and the samples $q_{m,n}$ (0≤m<$S_Q$) within Q sub-area.

$$p_{m,n}{'}=(pM_m \cdot \text{refM}_n+pR_m \cdot \text{refP}_n)>>sh$$

$$q_{m,n}{'}=(qM_m \cdot \text{refM}_n+qR_m \cdot \text{refQ}_n)>>sh \qquad [\text{Eq. 9}]$$

Here, in the two equations of Eq. 9, sh may have different values. All of $pM_m$, $pR_m$, $qM_m$, and $qR_m$ are predetermined coefficients of a long filter and may be shared between the video encoding apparatus and the video decoding apparatus. $\text{refP}_n$ may be defined as a weighted sum of at least one among $p_{m,n}$ (0≤m≤$S_P$) of line n where m denotes a value in descending order from $S_P$, and $\text{refQ}_n$ may be defined as a weighted sum of at least one among $q_{m,n}$ (0≤m≤$S_Q$) of line n where m denotes a value in descending order from $S_Q$. For example, $\text{refP}_n$ and $\text{refQ}_n$ may be defined by Eq. 10 below.

$$\text{refP}_n=(p_{S_P,n}+p_{S_P-1,n})>>sh$$

$$\text{refQ}_n=(q_{S_Q,n}+q_{S_Q-1,n})>>sh \qquad [\text{Eq. 10}]$$

Here, in the two equations of Eq. 10, sh may have different values.

Also, refM$_n$ may be defined as a weighted sum of at least one $p_{m,n}$ (0≤m≤S$_P$) of line n, where m denotes a value in ascending order from 0, and at least one $q_{m,n}$ (0≤m≤S$_Q$), where m denotes a value in ascending order from 0.

When S$_P$ and S$_Q$ are k$_0$, and a short and strong filter is selected, the deblocking performing unit 608 performs deblocking filtering on the samples $p_{m,n}$(0≤m<S$_P$) within P sub-area and the samples $q_{m,n}$(0≤m<S$_Q$) within Q sub-area. The deblocking performing unit 608 may define the filtering value by a weighted sum of $p_{m,n}$(0≤m≤S$_P$) and $q_{m,n}$ (0≤m≤S$_Q$) of line n. For example, deblocking filtering may be performed as shown in Eq. 11.

$$p'_{m,n} = \left(\sum_{i=0}^{S_P}(pW1_i \cdot p_{i,n}) + \sum_{j=0}^{S_Q}(qW1_j \cdot q_{j,n})\right) \gg sh \quad \text{[Eq. 11]}$$

$$q'_{m,n} = \left(\sum_{i=0}^{S_P}(pW2_i \cdot p_{i,n}) + \sum_{j=1}^{S_Q}(qW2_j \cdot q_{j,n})\right) \gg sh$$

Here, in the two equations of Eq. 10, sh may have different values. Also, all of pW1$_i$, qW1$_j$, pW2$_i$, and qW2$_j$ are predetermined coefficients of a strong filter and may be shared between the video encoding apparatus and the video decoding apparatus.

When a short and weak filter is selected, the deblocking performing unit 608 performs deblocking filtering on the samples $p_{m,n}$(0≤m<S$_P$) within P sub-area and the samples $q_{m,n}$(0≤m<S$_Q$) within Q sub-area. At this time, S$_P$ and S$_Q$ may have a value of 1 or 2. In the case of short and weak filtering, application of filtering may be re-assessed per line basis in P sub-area and Q sub-area and per pixel basis within a line.

Before filtering is performed on $p_{0,n}$ and $q_{0,n}$ of line n, Δ is calculated by Eq. 12.

$$\Delta = (a \cdot (q_{0,n} - p_{0,n}) + b \cdot (q_{1,n} - p_{1,n}) + c) \gg sh \quad \text{[Eq. 12]}$$

In Eq. 12, a, b, and c are predetermined constants and may be shared between the video encoding apparatus and the video decoding apparatus.

When the relationship (|Δ<w$_6$·t$_c$|) is satisfied, $p_{0,n}$ and $q_{0,n}$ may be filtered by Eq. 13. w$_6$ is a predetermined constant and may be shared between the video encoding apparatus and the video decoding apparatus.

$$p_{0,n}' = p_{0,n} + \Delta$$

$$q_{0,n}' = q_{0,n} - \Delta \quad \text{[Eq. 13]}$$

Also, for the line in which $p_{0,n}$ and $q_{0,n}$ have been filtered, filtering of $p_{1,n}$ and $q_{1,n}$ may be assessed. First, if S$_P$=2, and (|dP$_{n\_first}$|+|dP$_{n\_last}$|)<w$_7$·β, $p_{1,n}$ may be filtered by Eq. 14. w$_7$ is a predetermined constant and may be shared between the video encoding apparatus and the video decoding apparatus.

$$p_{1,n}' = p_{1,n} + \Delta p$$

$$\Delta p = (((p_{2,n} + p_{0,n}) \gg sh2) - (p_{1,n} + \Delta)) \gg sh \quad \text{[Eq. 14]}$$

Next, if S$_Q$=2, and (|dQ$_{n\_first}$|+|dQ$_{n\_last}$|)<w$_7$·β, $q_{1,n}$ may be filtered by Eq. 15.

$$q_{1,n}' = q_{1,n} + \Delta q$$

$$\Delta_q = (((q_{2,n} + q_{0,n}) \gg sh2) - (q_{1,n} + \Delta)) \gg sh \quad \text{[Eq. 15]}$$

Here, in the equations of Eqs. 13 to 15, sh and sh2 may have different values.

In the following descriptions, with reference to FIG. 12, a deblocking filtering method applied to a restored area of an image by a deblocking filtering apparatus is described. As described above, the deblocking filtering method may be equally performed in the video encoding apparatus and the video decoding apparatus.

Figure 12:
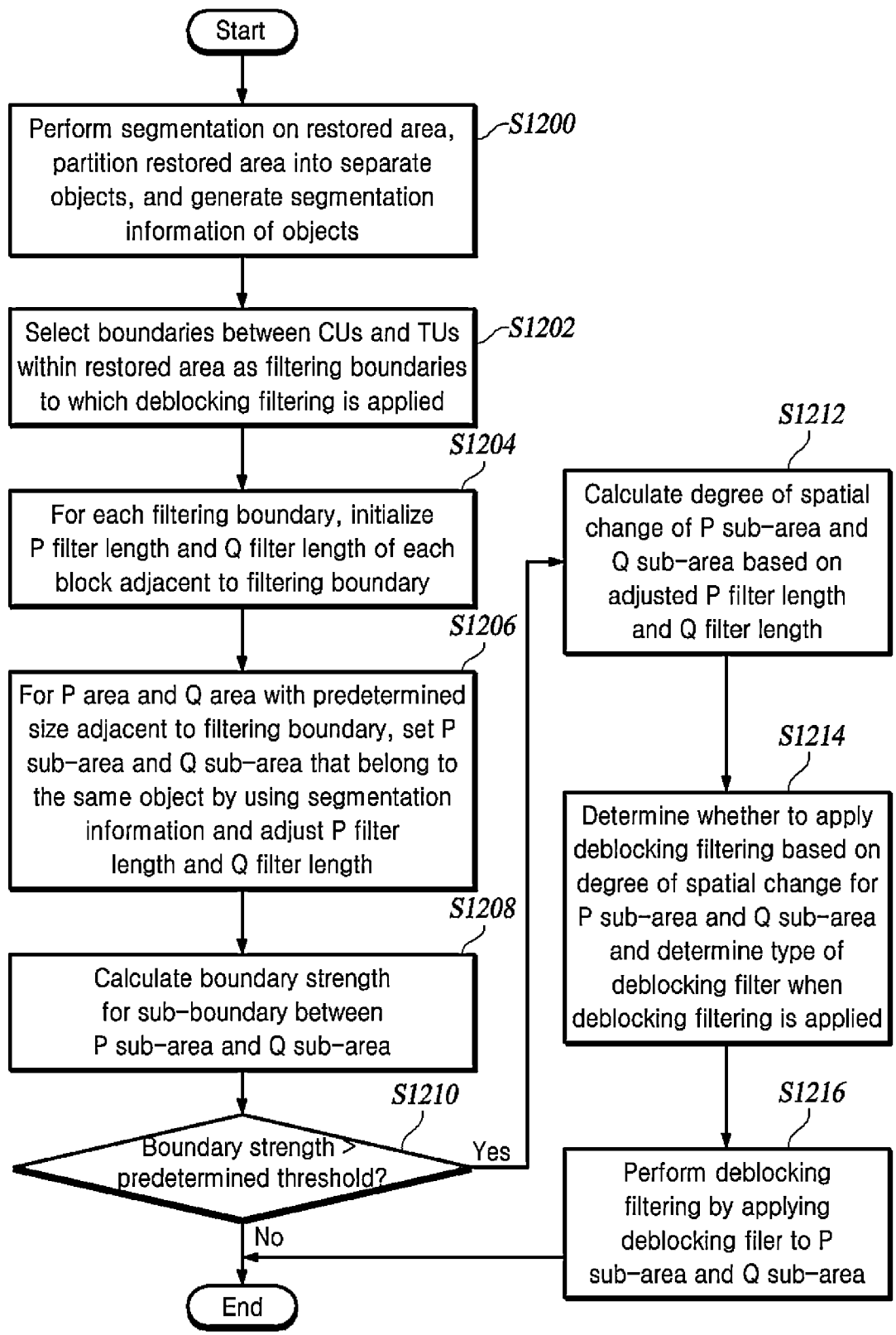
FIG. 12 is a flow diagram illustrating a deblocking filtering method according to one embodiment of the present disclosure.

FIG. 12 is a flow diagram illustrating a deblocking filtering method according to one embodiment of the present disclosure.

The deblocking filtering apparatus performs segmentation on the restored area to partition the restored area into separate objects and generates segmentation information of the objects (S1200).

Here, the restored area may be a picture, a slice, or a plurality of CUs. Also, the segmentation information of the objects may be a map in which each object is assigned a corresponding index on a per pixel of the restored image.

The deblocking filtering apparatus may obtain the number of objects per picture or slice basis and then may partition the image into as many sub-images as the number of objects. For example, the deblocking filtering apparatus within the video encoding apparatus may obtain the number of objects from a high-level, and the deblocking filtering apparatus within the video decoding apparatus may decode the number of objects from a bitstream.

The deblocking filtering apparatus selects boundaries between CUs and TUs within the restored area as filtering boundaries to which deblocking filtering is applied (S1202). Also, the deblocking filtering apparatus may select the boundaries between PUs within a CU as the filtering boundaries.

Meanwhile, when a block boundary among the filtering boundaries coincides with a picture boundary, deblocking may not be applied. Also, deblocking may not be applied when a block boundary coincides with a subpicture, tile, or slice boundary, but in-loop filtering is not performed at the corresponding subpicture, tile, or slice boundary.

For each filtering boundary, the deblocking filtering apparatus initializes P filter length and Q filter length of each block adjacent to the filtering boundary (S1204).

As shown in FIG. 7, the filter length represents the number of samples to which deblocking filtering is applied for blocks P and Q adjacent to the filtering boundary.

At the CU/TU boundary, P filter length S$_P$ and Q filter length S$_Q$ are initialized to k$_2$ when the size of the CU/TU block's side is 32 or more, P filter length S$_P$ and Q filter length S$_Q$ are initialized to 1 when the size is 4 or less, and P filter length S$_P$ and Q filter length S$_Q$ are initialized to k$_0$ for other cases. Also, when a PU within a CU is used, at the CU/TU boundary, S$_P$ is initialized to min(k$_1$, S$_P$), and S$_Q$ is initialized to min(k$_1$, S$_Q$). Also, when the difference between the CU/TU boundary and the PU boundary is 4, S$_P$ and S$_Q$ are initialized to 1, S$_P$ and S$_Q$ are initialized to 2 when the difference is 8, and S$_P$ and S$_Q$ are initialized to k$_0$ in other cases.

For P area and Q area with a predetermined size adjacent to the filtering boundary, the deblocking filtering apparatus sets P sub-area and Q sub-area that belong to the same object by using segmentation information and adjusts P filter length and Q filter length (S1206).

Here, P area and Q area represent areas with a size of M×N, which are adjacent to the boundary segment with a sample length of N among the filtering boundaries and include N lines perpendicular to the boundary segment, each of which includes M samples.

The deblocking filtering apparatus performs deblocking filtering when the consecutive sub-boundary present between P area and Q area is longer than or equal to a predetermined sample length min_row_num, and the minimum of the numbers of samples included in the respective lines of P area and Q area perpendicular to the sub-boundary is larger than or equal to a predetermined threshold value ($k_0+1$). Accordingly, when a sub-boundary is smaller than the predetermined sample length or the minimum number is smaller than the predetermined threshold value, deblocking filtering is not performed on the P area and the Q area adjacent to the corresponding sub-boundary.

When performing deblocking filtering, the deblocking filtering apparatus may set the filter length of P sub-area to one of predetermined values ($k_0$, $k_1$, $k_2$) according to the minimum number. Also, the size of P sub-area may be determined based on the consecutive sub-boundary and the filter length of P sub-area. For P sub-area, the deblocking filtering apparatus adjusts $S_P$ to the minimum of the filter length of P sub-area and the initialized $S_P$.

In the same way, when performing deblocking filtering, the deblocking filtering apparatus may set the filter length of Q sub-area to one of predetermined values according to the minimum number. Also, the size of Q sub-area may be determined based on the consecutive sub-boundary and the filter length of Q sub-area. For Q sub-area, the deblocking filtering apparatus adjusts $S_Q$ to the minimum of the filter length of Q sub-area and the initialized $S_Q$.

The deblocking filtering apparatus calculates the boundary strength for the sub-boundary between P sub-area and Q sub-area (S1208). The boundary strength bS may be determined according to the coding characteristics of P sub-area and Q sub-area.

The deblocking filtering apparatus checks whether the boundary strength is larger than a predetermined threshold (S1210).

If the boundary strength is less than or equal to the predetermined threshold (e.g., zero) (No in S1210), the deblocking filtering apparatus omits deblocking filtering for the corresponding sub-boundary.

If the boundary strength is larger than the predetermined threshold (Yes in S1210), the deblocking filtering apparatus performs the followings steps for deblocking filtering of the corresponding sub-boundary.

The deblocking filtering apparatus calculates the degree of spatial change of P sub-area and Q sub-area based on the adjusted P filter length and Q filter length (S1212).

The deblocking filtering apparatus may calculate the degree of spatial change using the samples of the first line and the samples of the last line among the lines perpendicular to the sub-boundary between P sub-area and Q sub-area. The degree of spatial change may be used to suppress filtering of natural edges.

The deblocking filtering apparatus determines whether to apply deblocking filtering based on the degree of spatial change for P sub-area and Q sub-area and determines the type of deblocking filter when deblocking filtering is applied (S1214). As described above, the deblocking filter may be determined as one of a long filter, a short and strong filter, and a short and weak filter.

The deblocking filtering apparatus performs deblocking filtering by applying a deblocking filer to P sub-area and Q sub-area (S1216).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure should not be limited by the above explicitly described embodiments but by the claims and equivalents thereof.

REFERENCE NUMERALS

182: deblocking filter
562: deblocking filter
602: filter length determining unit
604: boundary strength calculation unit
606: deblocking determining unit
608: deblocking performing unit
902: segmentation performing unit
904: filter length adjusting unit

What is claimed is:

1. A method performed by a video encoding apparatus for applying deblocking filtering on a restored area of an image, the method comprising:
    performing segmentation on the restored area to partition the restored area into separate objects and generating segmentation information for identifying the objects;
    selecting within the restored area, a filtering boundary to which the deblocking filtering is applied;
    in a P area and a Q area which form the filtering boundary, setting a P sub-area and a Q sub-area belonging to the same object using the segmentation information; and
    performing the deblocking filtering for a sub-boundary between the P sub-area and the Q sub-area,
    wherein the deblocking filtering is performed based on:
        a length of the sub-boundary between the P sub-area and the Q sub-area, and for each of the P sub-area and the Q sub-area, a number of samples on a line perpendicular to the sub-boundary.

2. The method of claim 1, wherein the segmentation information of the objects is a map in which each object is assigned a corresponding index per pixel basis.

3. The method of claim 1, further comprising:
obtaining the number of objects within the restored area from a high-level, wherein
generating the segmentation information partitions the restored area into as many sub-areas as the number of objects.

4. The method of claim 1, further comprising:
obtaining a flag indicating whether to perform the segmentation from a high-level,
wherein, when the flag is true, the segmentation is performed.

5. The method of claim 4, wherein, when the same segmentation method is performed respectively on the original area and the restored area, and a pixel difference as large as a predetermined threshold value occurs between the segmentation results from the original area and the restored area, the flag is set as false.

6. The method of claim 1, wherein the deblocking filtering is performed when the sub-boundary between the P sub-area and the Q sub-area is longer than or equal to a predetermined sample length, and when, for each of the P sub-area and the Q sub-area, a minimum value of the numbers of samples on respective lines perpendicular to the sub-boundary is larger than or equal to a predetermined threshold value.

7. The method of claim 6, wherein, when the sub-boundary is shorter than the predetermined sample length or when at least one of the minimum value for the P sub-area and the minimum value for the Q sub-area is smaller than the predetermined threshold value, the deblocking filtering is not performed.

8. The method of claim 6, wherein performing the deblocking filtering comprises:
setting a filter length of the P sub-area to one of predetermined values according to the minimum number.

9. The method of claim 8, wherein performing the deblocking filtering comprises:
setting a P filter length for the P sub-area to the minimum of the filter length of the P sub-area and an initialized P filter length.

10. The method of claim 1, wherein performing the deblocking filtering comprises:
calculating a boundary strength of the sub-boundary between the P sub-area and the Q sub-area,
wherein, when the boundary strength is larger than a predetermined threshold value, the deblocking filtering is performed on the P sub-area and the Q sub-area adjacent to the sub-boundary.

11. The method of claim 6, wherein performing the deblocking filtering comprises:
calculating a degree of spatial change by using samples of a first line and samples of a last line among the lines perpendicular to the sub-boundary in the P sub-area and Q sub-area; and
performing the deblocking filtering based on the degree of spatial change.

12. The method of claim 1, wherein the deblocking filer is one of a long filer, a short and strong filter, or a short and weak filter.

13. A deblocking filtering method performed by a video decoding apparatus, the method comprising:
obtaining segmentation information for identifying separate objects on a restored area;
selecting, within the restored area, a filtering boundary to which deblocking filtering is applied;
in a P area and a Q area, which form the filtering boundary, setting a P sub-area and a Q sub-area belonging to the same object using the segmentation information; and
performing the deblocking filtering for a sub-boundary between the P sub-area and the Q sub-area,
wherein the deblocking filtering is performed based on:
a length of the sub-boundary between the P sub-area and the Q sub-area, and
for each of the P sub-area and the Q sub-area, a number of samples on a line perpendicular to the sub-boundary.

14. A method for providing video data to a video decoding apparatus, the method comprising:
encoding the video data into a bitstream; and
transmitting the bitstream to the video decoding apparatus,
wherein encoding the video data comprises:
performing segmentation on the restored area to partition a restored area into separate objects and generating segmentation information for identifying the objects;
selecting, within the restored area, a filtering boundary to which deblocking filtering is applied;
in a P area and a Q area which form the filtering boundary, setting a P sub-area and a Q sub-area belonging to the same object using the segmentation information; and
performing the deblocking filtering for a sub-boundary between the P sub-area and the Q sub-area,
wherein the deblocking filtering is performed based on:
a length of the sub-boundary between the P sub-area and the Q sub-area, and
for each of the P sub-area and the Q sub-area, the number of samples on a line perpendicular to the sub-boundary.

* * * * *